United States Patent [19]

Witkowski et al.

[11] Patent Number: 5,056,022
[45] Date of Patent: Oct. 8, 1991

[54] THROTTLE POSITION SENSOR ERROR RECOVERY CONTROL METHOD

[75] Inventors: Michael R. Witkowski, Sterling Heights; William J. Bolander, Clarkston; Larry T. Nitz, Troy, all of Mich.

[73] Assignees: Saturn Corporation, Troy, Mich.; Delco Electronics Corporation, Kokomo, Ind.

[21] Appl. No.: 587,929

[22] Filed: Sep. 24, 1990

[51] Int. Cl.⁵ .............................................. G06F 15/00
[52] U.S. Cl. ................................... 364/424.1; 74/866; 364/431.11; 364/571.01
[58] Field of Search ..................... 364/431.11, 571.01, 364/424.1; 74/866; 123/379

[56] References Cited

U.S. PATENT DOCUMENTS

| | | | |
|---|---|---|---|
| 4,490,804 | 12/1984 | Martinsons | 364/571 |
| 4,523,565 | 6/1985 | Omitsu | 123/399 |
| 4,586,403 | 5/1986 | Lee et al. | 74/866 |
| 4,704,685 | 11/1987 | Martinsons et al. | 364/431.11 |
| 4,833,613 | 5/1989 | Mack et al. | 364/424.05 |
| 4,887,491 | 12/1989 | Holbrook et al. | 74/866 |

*Primary Examiner*—Salvatore Cangialosi
*Attorney, Agent, or Firm*—Mark A. Navarre

[57] ABSTRACT

A transmission controller in which the throttle position sensor signal is used to determine the throttle position so that proper shift selection may be carried out. In the event that the throttle position sensor malfunctions, a value is calculated for the throttle position based upon the manifold atmospheric pressure, then used in place of the actual value for throttle position. Such a substitution remains in effect until the throttle position sensor is properly functioning once again and the actual value for the throttle position is suitable close to the calculated value so that reversion to the actual value will occur without causing shifts that will surprise the driver who is not expecting any such shift.

3 Claims, 5 Drawing Sheets

THROTTLE POSITION SENSOR ERROR RECOVERY CONTROL METHOD

This invention relates to electronic control of an automotive transmission system, in particular to a method for error detection and handling for a throttle position sensor.

BACKGROUND OF THE INVENTION

Prior art in the area of throttle position sensor error handling generally employs some form of substitution of a calculated value for throttle position if an error is detected in the signal from the throttle position sensor. Some systems also will cease substitution of a calculated value and return to using the actual throttle position signal when the malfunction is no longer detected.

The methods of substitution are varied in form. A simple method is using a value which will allow the vehicle to function in a reduced capability mode providing limp-home operation. A second method makes use of two or three values for the throttle position which are selected according to other engine parameters. This offers a more improved limp-home capability by providing a wider range of throttle position values under which the engine can operate. A third method of substitution uses a map to provide throttle position as a function of manifold pressure and/or some other engine operation condition parameter. The goal of this method is to make the presence of an error in the throttle position sensor transparent to the driver.

Prior art also recovers from the disappearance of a throttle position sensor error in varying ways. Some control systems do not attempt to return to the actual throttle position value and continue using a selected method of substitution. Other control systems return to the actual signal returned by the sensor once it is found to be operating properly. Re-establishing the use of the actual throttle position sensor may be accomplished by ramping from the substituted value to the actual value gradually each time that the controller must produce a throttle position value. The main drawback of these methods of recovery is that because gear selection is based on throttle position, unexpected and unwarranted shifting may occur. Such shifts are an annoyance to the driver especially when occurring while in a constant speed mode.

SUMMARY OF THE PRESENT INVENTION

The present invention is directed towards an improved method for handling a failure of the throttle position sensor and its possible, subsequent recovery. When a throttle position sensor error is detected, a value is calculated for throttle position and substituted for the actual erroneous value. The calculated value is used until it is determined that the throttle position sensor is functioning properly and the difference between the actual and the calculated value for throttle position falls within a predefined range. No reversion to the actual throttle position value will occur until the difference is suitably small. This will enable error handling to remain completely transparent to the driver and improve the operation of the vehicle because no unexpected shifts will occur.

The improved error handling is accomplished by monitoring the performance of the throttle position sensor signal to ensure that it is within a range bounded by minimum and maximum allowable values. When the throttle position sensor signal falls outside this range, a counter is incremented until a specified number of failures have occurred at which time use of a calculated value will take place. Substitution will occur at this point and continue until the error in the throttle position is no longer present.

DETAILED DESCRIPTION OF THE INVENTION

Figure 1:
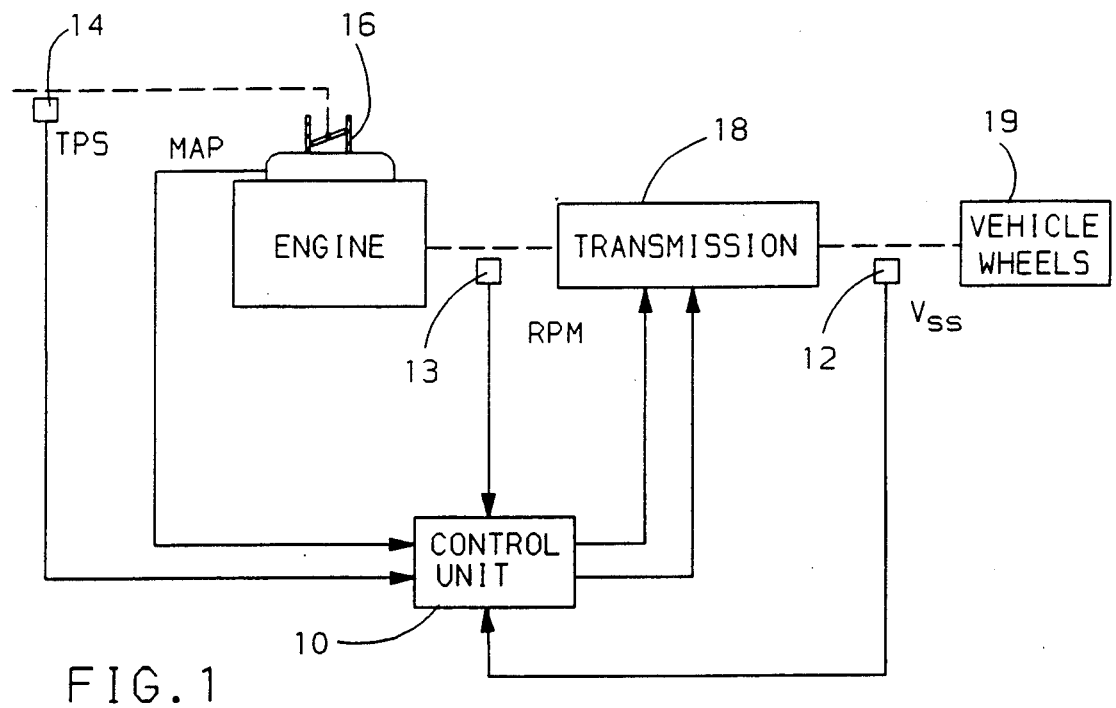
FIG. 1 is a system diagram, including a computer based control unit, of a transmission control system.

In FIG. 1, there is depicted a general overview of the control system for an automatic transmission. Featured in this system is control unit 10 with inputs from vehicle speed sensor ($V_{ss}$) 12, engine speed sensor 13, throttle position sensor (TPS) 14, and the manifold atmospheric pressure sensor (MAP) 16. The control unit is connected to the vehicle transmission 18, which, when engaged, causes the wheels 19 of the vehicle to rotate and propel the vehicle.

Figure 2:
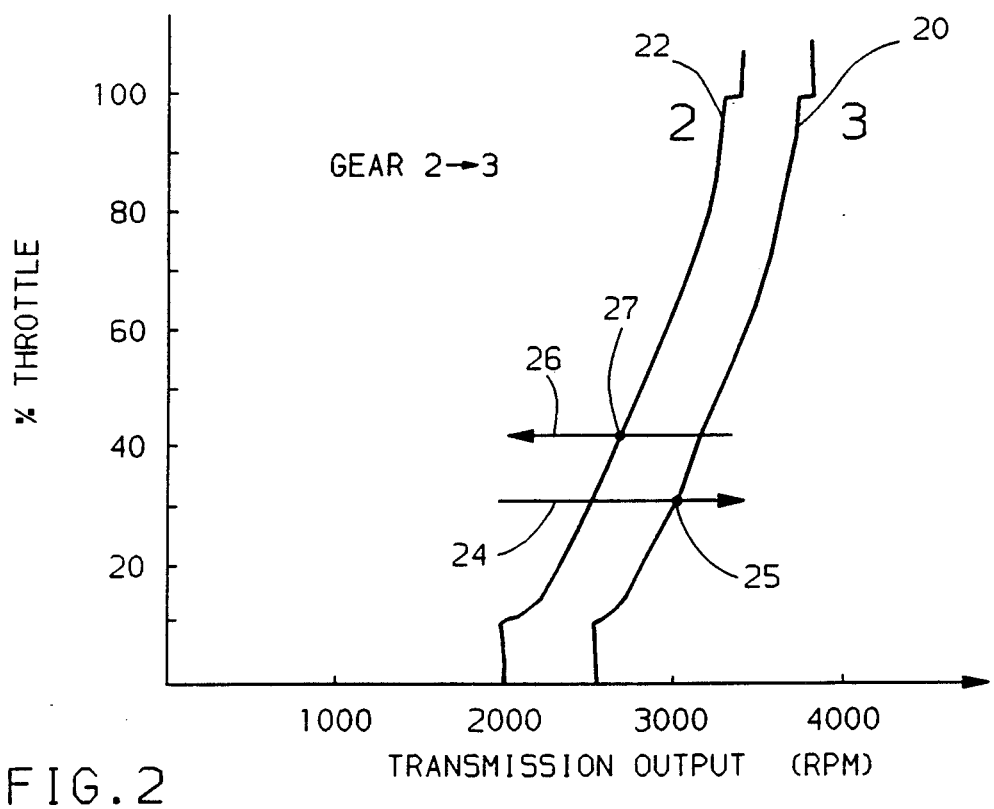
FIGS. 2 and 3 are graphs depicting typical shift schedules for a transmission and examples of how upshifts and downshifts occur.

FIG. 2 depicts a typical shift schedule of an automatic transmission as a function of transmission output speed in revolutions per minute (RPM) and of throttle opening by percentage as derived from the signal returned from the TPS for shifts between second and third gears. Line 20 is the shift point at which a transmission would upshift from second to third gear as percent throttle decreases or transmission RPM increases. Line 22 is the point at which a transmission would downshift from third to second gear as percent throttle increases or transmission RPM drops. The shift points incorporate hysteresis to avoid unnecessary shifts for minor changes in percent throttle opening or transmission output speed. As an example of an upshift, line 24 shows the second gear to third gear upshift that will occur as the throttle position (TP) remains fixed at 30% as the transmission RPM increases from 2000 RPM to 3200 RPM. An upshift to third gear will occur at point 25 as RPM increases and the shift line is crossed. As an example of a downshift, line 26 shows the third gear to second gear downshift that will occur when the percent throttle position remains fixed at 40% and transmission RPM drops from 3200 RPM to 2000 RPM. A downshift to second gear will occur at point 27 as RPM decreases and the shift line is crossed.

Figure 3:
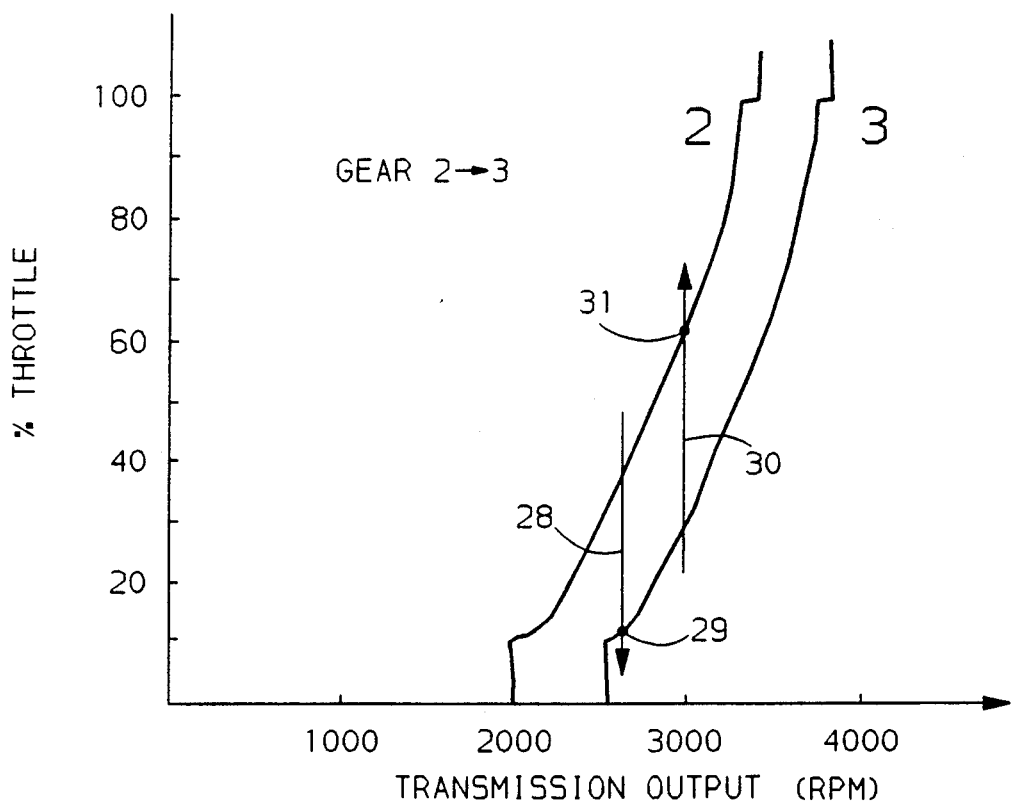

FIG. 3 is similar to FIG. 2 except that in lines 28 and 30, the transmission RPM remains constant, but the percent throttle changes. A second to third upshift will come about at point 29 along line 28 when the percent throttle decreases and the transmission RPM remains constant. A third to second downshift will come about at point 31 along line 30 when the percent throttle position increases and the transmission RPM remains constant. When the percent throttle changes for a constant transmission RPM, an upshift or a downshift may occur. Sometimes these shifts are the result of changes in the driver's required engine demand, but they may also be the result of an unwarranted change in the indicated percent throttle position as may occur in the case of a faulty TPS.

A typical scenario that produces these downshifts occurs when the TPS has failed. The driver may be driving at a constant speed, unaware that the transmission controller has detected a TPS failure. The controller compensates for the failure by substituting a value that is calculated as a function of other engine parameters. At some point later, the controller determines that the TPS is functioning properly and returns to using the actual value returned by the TPS as compared to the calculated value. However, because the TPS is now functioning properly, it does not necessarily follow that the throttle position reflected by the TPS is close to the value of TP calculated by the controller. If the controller uses the actual value without ensuring that the actual and the calculated are within a prescribed range of each other, the transition could cause a downshift for no reason apparent to the driver. Such downshifts are annoying and disconcerting to the driver where there has been no change in the operating condition of the vehicle. In the worst case, if the TPS fails repeatedly, several downshifts could occur, resulting in unnecessary wear on the transmission.

Figure 4A:
FIGS. 4a–4c is graph depicting a preferred routine for handling throttle position sensor failure and recovery.
Figure 4B:
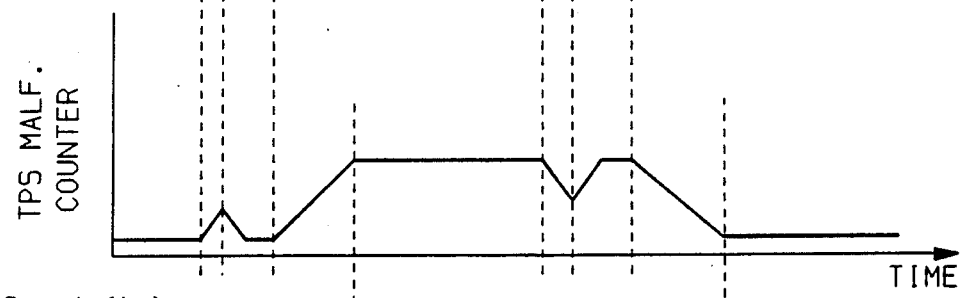
Figure 4C:
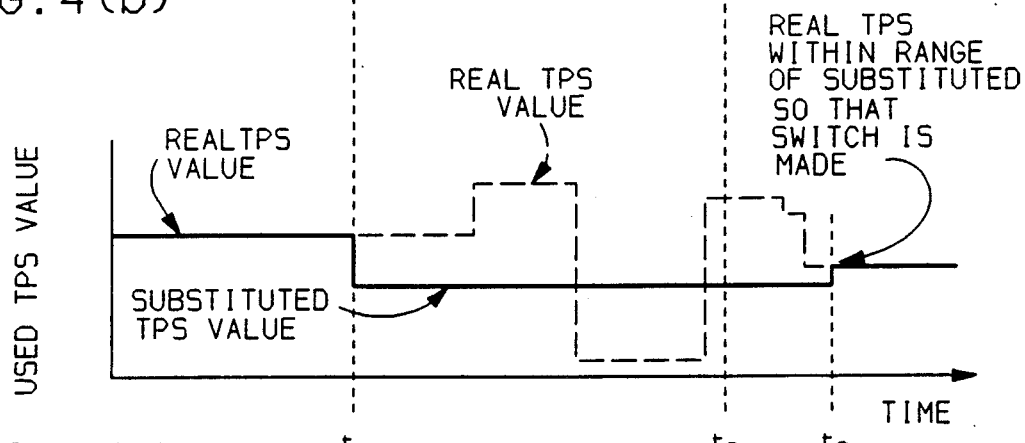

FIGS. 4a-4c shows the relationship between the throttle position values returned to the engine controller from the TPS, FIG. 4a, the TPS malfunction counter, FIG. 4b, and the use of the calculated versus the actual value for throttle position, FIG. 4c. FIG. 4a is a graph which is used to show if a value received from the TPS is determined to be valid or invalid. Where the signal is high the values are valid, and where the signal is low, the values are invalid. FIG. 4b shows the malfunction counter's response to valid and invalid values. When a TPS reading is invalid, the counter is incremented up to a maximum value at which an error in the TPS is assumed. When the values are valid, the counter is decremented unless it is already 0.

FIG. 4c shows a possible scenario for how substitution of a calculated TP value for an actual TP value could take place. Once the TP error counter reaches a specified level at time $t_1$, a TPS failure is assumed and a TP value is calculated as a function of MAP which is substituted for the actual value returned from the TPS. At that point the calculated value is used for throttle position until 2 conditions occur: (1) the error counter in FIG. 4b must return to 0 as shown at time $t_2$, and (2) the actual and the calculated values for throttle position must be within a specified range of each other. In FIG. 4c, line 32 shows one set of values for TP that the failed TPS could take on while malfunctioning. Even though the malfunction counter has returned to 0, the calculated throttle position value is still employed until the calculated and the actual values are within the same window at time $t_3$. This window is defined as being some constant such that the magnitude of the difference between the actual and the calculated TP values is less than that constant.

Figure 5:
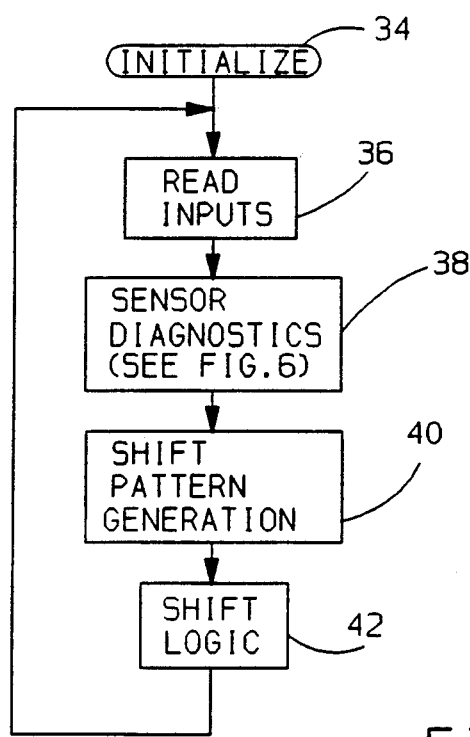
FIGS. 5 and 6a $\propto$ 6b are flow diagrams showing the overall transmission control program in general and the throttle position sensor failure detection and handling routine in particular.

FIG. 5 is a flow diagram showing the general operation of transmission controller 10 in FIG. 1. Upon startup, the controller starts at bubble 34 where variables used by the algorithm are initialized. After initialization, the inputs are read by the controller as indicated in block 36. The inputs from block 36 are then analyzed at block 38 where they are determined to be in range or out of range and appropriate malfunction flags are set.

Figure 6A:
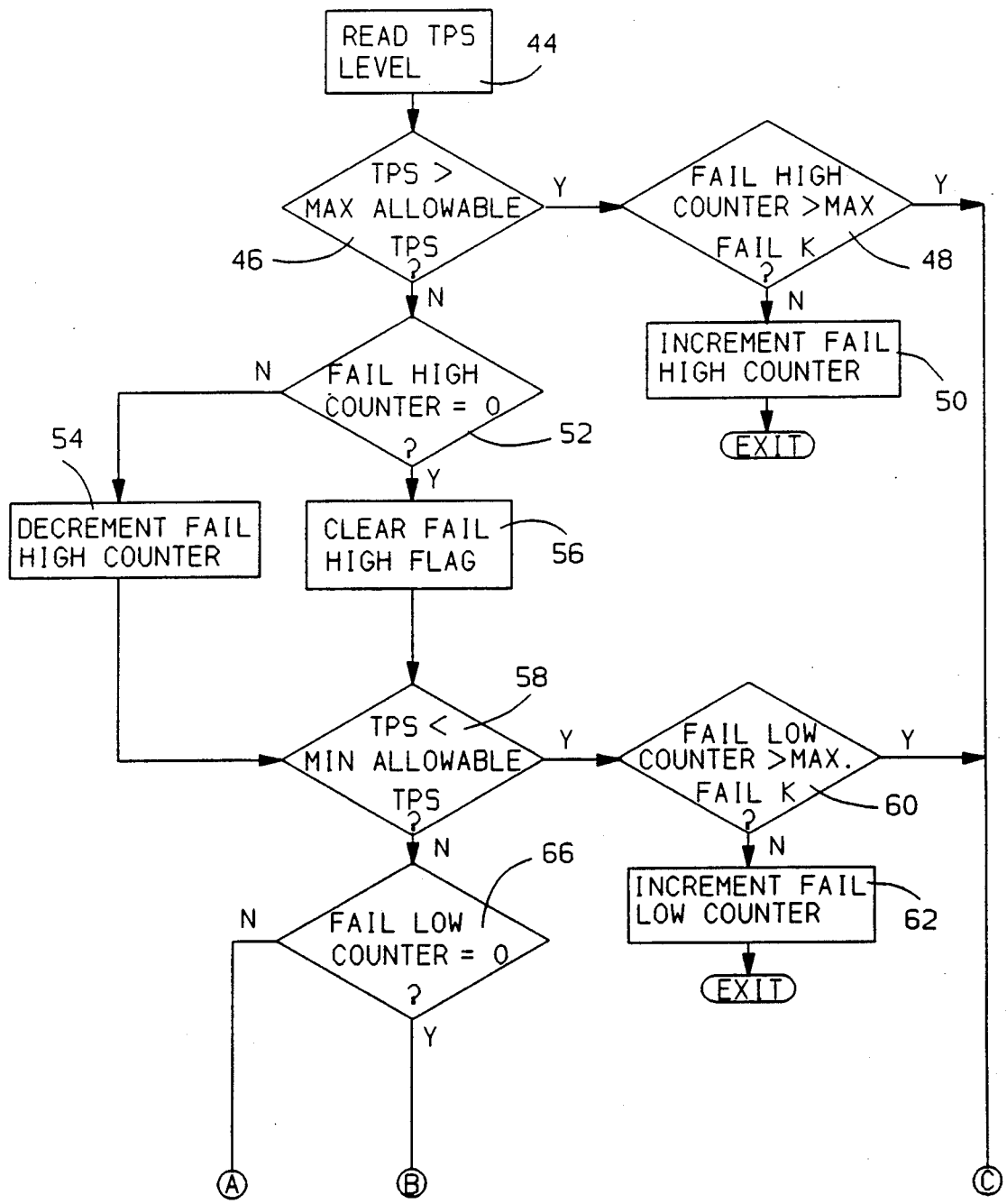
Figure 6B:
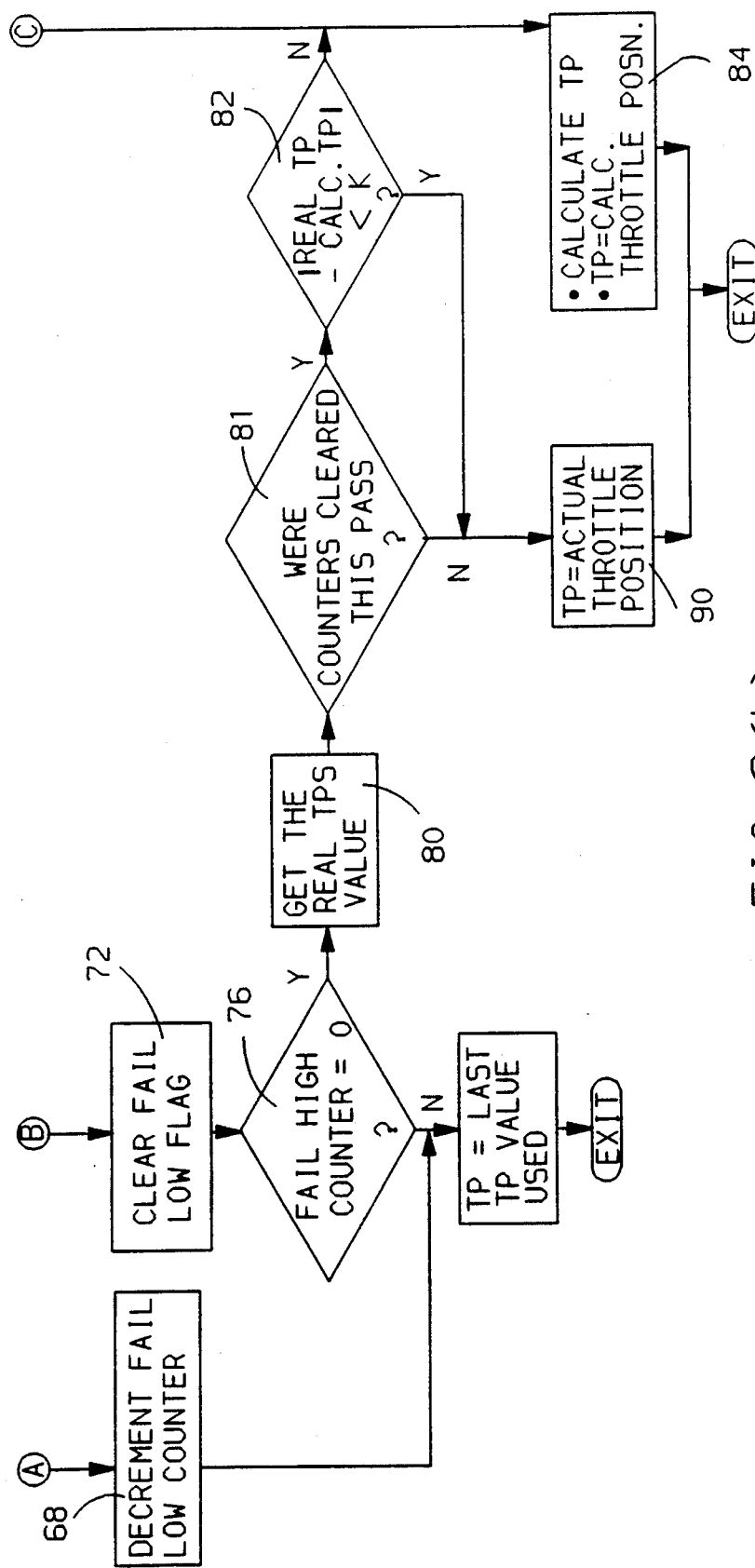

Block 38 calls the algorithm whose flow is diagrammed in FIGS. 6a-6b. It is at this point that the TPS is analyzed for errors. When control is returned to block 38, it advances to block 40. Block 40 uses the information about throttle position to choose the proper gear. The proper gear is selected from tables in the controller's memory which are similar to that in FIG. 2 and FIG. 3. If the throttle position or transmission output speed have changed sufficiently, block 40 will request that a shift take place. Once the proper gear is decided, control passes to block 42 where a shift, if requested, is performed through the direction of the controller through either electrical or mechanical means. Control then passes back to block 36 where the process is repeated for the duration of the engine's operation.

FIGS. 6a-6b represents the logic that is called from block 38 in FIG. 5 and describes the methodology used to determine if the TPS has failed and whether to use a calculated value for the TP. The methodology commences by reading the signal returned from the TPS as shown in block 44. Once the TPS value is read diamond 46 checks to see if it exceeds the maximum allowable value, a high failure, and if so control passes to diamond 48. Diamond 48 tests if the number of high failures is above a set maximum. If not, control passes to block 50 which increments the high failure counter. The high failure counter is incremented in situations where the TPS reading exceeds the maximum limit and decremented or left at 0 for every instance where it does not exceed the maximum limit. The purpose of the counter is to keep a history of the TPS high failures so that a minimum good-reading:bad-reading ratio of at least 1 must be maintained to assume that the sensor is functioning properly in its upper range. From block 50, control returns to block 40, FIG. 5, where it is determined if a shift is necessary. If the number of high failures is above the maximum allowable, a value for TP is then calculated and used for transmission control as is done in block 84 to be described herein.

If the test in diamond 46 indicates that the TPS value is less than the maximum allowable limit, control then passes to diamond 52 which checks to see if the high failure counter is equal to 0. If the high failure counter is not 0, then it is decremented at block 54, otherwise, the fail high flag is cleared at block 56 indicating that there are no recorded instances remaining on the counter of the TPS value exceeding the maximum allowable. A similar analysis as described in the preceding paragraphs is performed starting at diamond 58 except the TPS signal is examined to determine if it is returning values below the minimum allowable range.

At diamond 58, the TPS signal is compared against a minimum acceptable out of range value. If the signal is below this minimum, a low failure, control advances to diamond 60 where a counter for the number of low failures is tested to see if it exceeds some maximum number of allowable low failures. If the number of low failures does not exceed that maximum value, control passes to block 62 where the failure low counter is incremented, and control is returned to block 40, FIG. 5, which uses the TP value last used, whether actual or calculated, for TP. If the number of low failure counts does exceed the maximum allowable, a value for TP is calculated as a function of MAP and then assigned to TP at block 84. If at diamond 58, the TPS signal is not below the minimum, control passes to diamond 66.

Diamond 66 tests the number of low failures that remain on the low failure counter. If the counter is not 0, the low failure counter is decremented at block 68. Control then returns to the calling block 40, FIG. 5. If this occurs, the value that is used for TPS is the same value that was used in the last iteration of the transmission control loop. If there are no failures remaining on the counter, the low failure flag is cleared in block 72. After clearing the low failure flag the high failure flag is then tested in diamond 76 to determine if there are any high failures. If there are still high failures registered on the high failure counter, then the program exits, otherwise control passes to block 80.

In block 80, the TPS signal is normalized and scaled. After the actual TP is returned from block 80, it must be determined if this is the first instance where either or both of the failure counters were cleared, as takes place at diamond 81. That is, the calculated value of TP is currently being used for TP, but the malfunction no longer appears to be present; therefore, the actual and calculated TP should be compared to see if they are within the same window. If it is not necessary to compare the calculated and actual TP values, block 90 sets the TP to the actual value returned by the sensor. If it is necessary, block 82 compares the absolute value of the difference between the actual and the last calculated TP value to a constant that defines a range within which both values should be in order to return to use of the actual value. If both values fall within the specified window, TP is set to the actual throttle position in block 90, and control is returned to the main transmission loop, block 40, FIG. 5. If the values are not both within a window, an updated value for TP is calculated in block 84 as a function of MAP. This value for TP will then be assigned to the calculated value, after which control is returned to the main control program, block 40, FIG. 5.

The embodiments of the invention in which an exclusive property or privilege is claimed are defined as follows:

1. A method of operation for a vehicle powertrain controller which schedules shifting of an automatic transmission as a function of a throttle position variable, the method comprising the steps of:
   setting the throttle position variable in accordance with a sensor value returned from an engine throttle position sensor;
   analyzing the sensor value to determine if the throttle position sensor is functioning properly;
   setting the throttle position variable in accordance with a default value corresponding to an estimate of throttle position so long as it is determined that the throttle position sensor is not functioning properly; and
   resuming the setting of the throttle position variable in accordance with the sensor value once it is determined that (1) the throttle position sensor is functioning properly, and (2) the difference between the default value and the sensor value is within a reference amount, thereby to avoid transmission shifting due to unnecessary abrupt changes in the throttle position variable.

2. A method of operation for a vehicle powertrain controller, as recited in claim 1, wherein the step of determining if the throttle position sensor is functioning properly includes the steps of:
   measuring the sensor value;
   comparing the sensor value to minimum and maximum values which form an acceptable range of throttle positions; and
   determining if the sensor value is within the acceptable range formed by the minimum and maximum values.

3. A method of operation for a vehicle powertrain controller which schedules shifting of an automatic transmission as a function of a throttle position variable, the method comprising the steps of:
   setting the throttle position variable in accordance with a sensor value returned from an engine throttle position sensor;
   periodically measuring the sensor
   comparing the sensor value to minimum and maximum values which form an acceptable range of throttle positions;
   setting the throttle position variable in accordance with a default value corresponding to an estimate of throttle position if it is determined that the throttle position sensor is not functioning properly;
   monitoring the sensor value to determine if it is within the acceptable range for a fixed number of measurements to ensure that the sensor is functioning properly; and
   determining if the difference between the default value and the sensor value is within a reference amount and resuming the setting of the throttle position variable in accordance with the sensor value if it is determined that the sensor is functioning properly and the difference is within such reference amount.

* * * * *